Aug. 3, 1965       M. W. LOVELAND       3,198,312
              FRUIT ORIENTOR
Filed Nov. 5, 1962                9 Sheets-Sheet 3
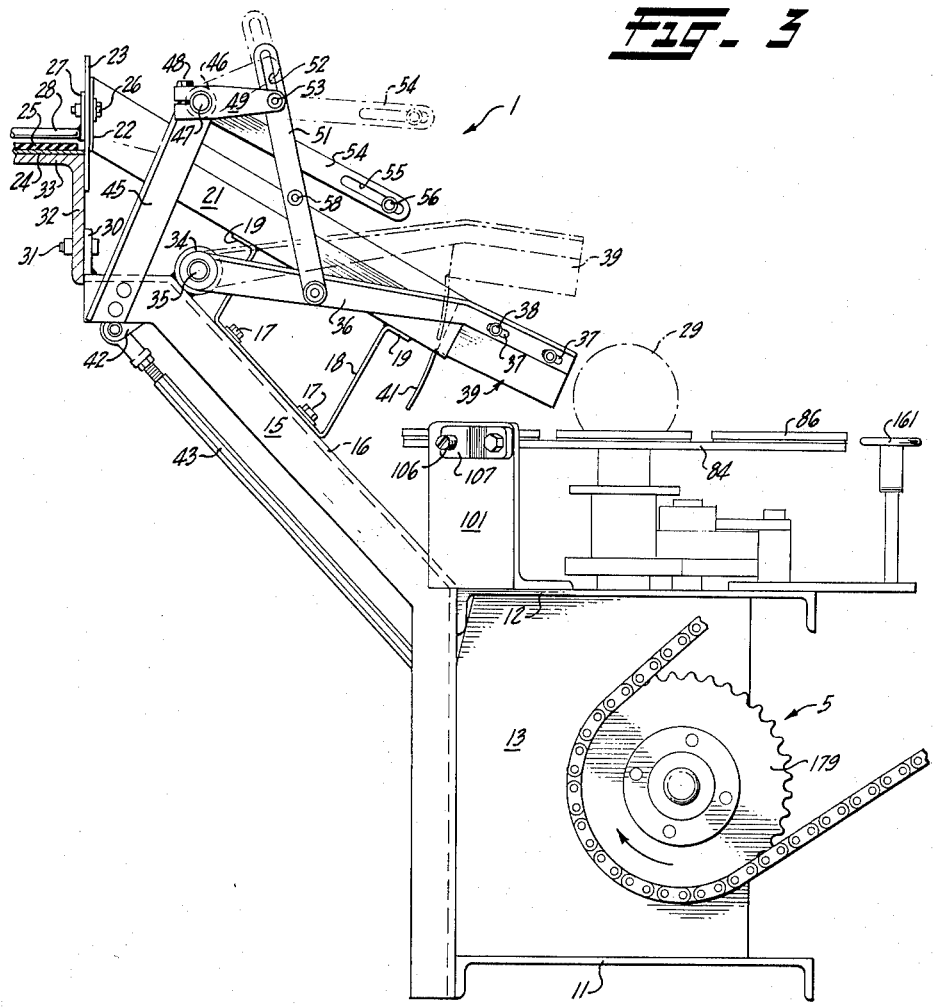
INVENTOR:
MALCOLM W. LOVELAND
BY
        ATTORNEYS

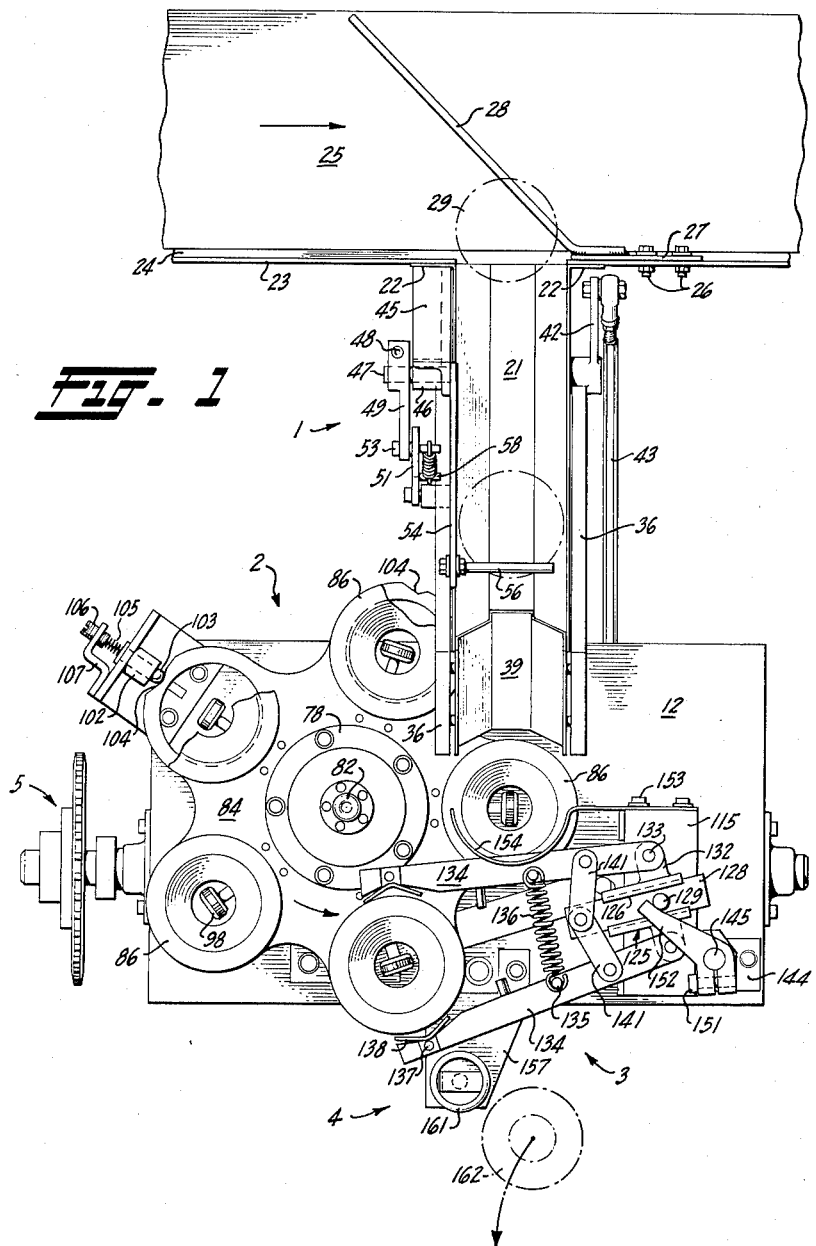

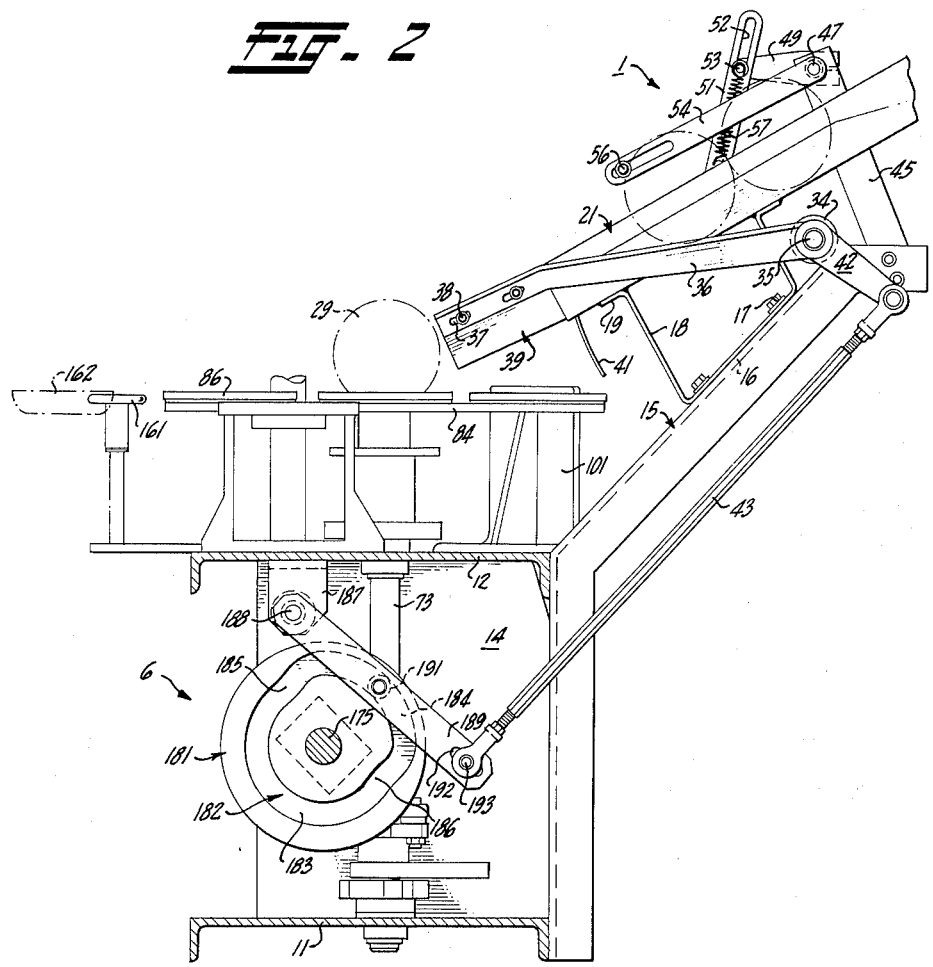

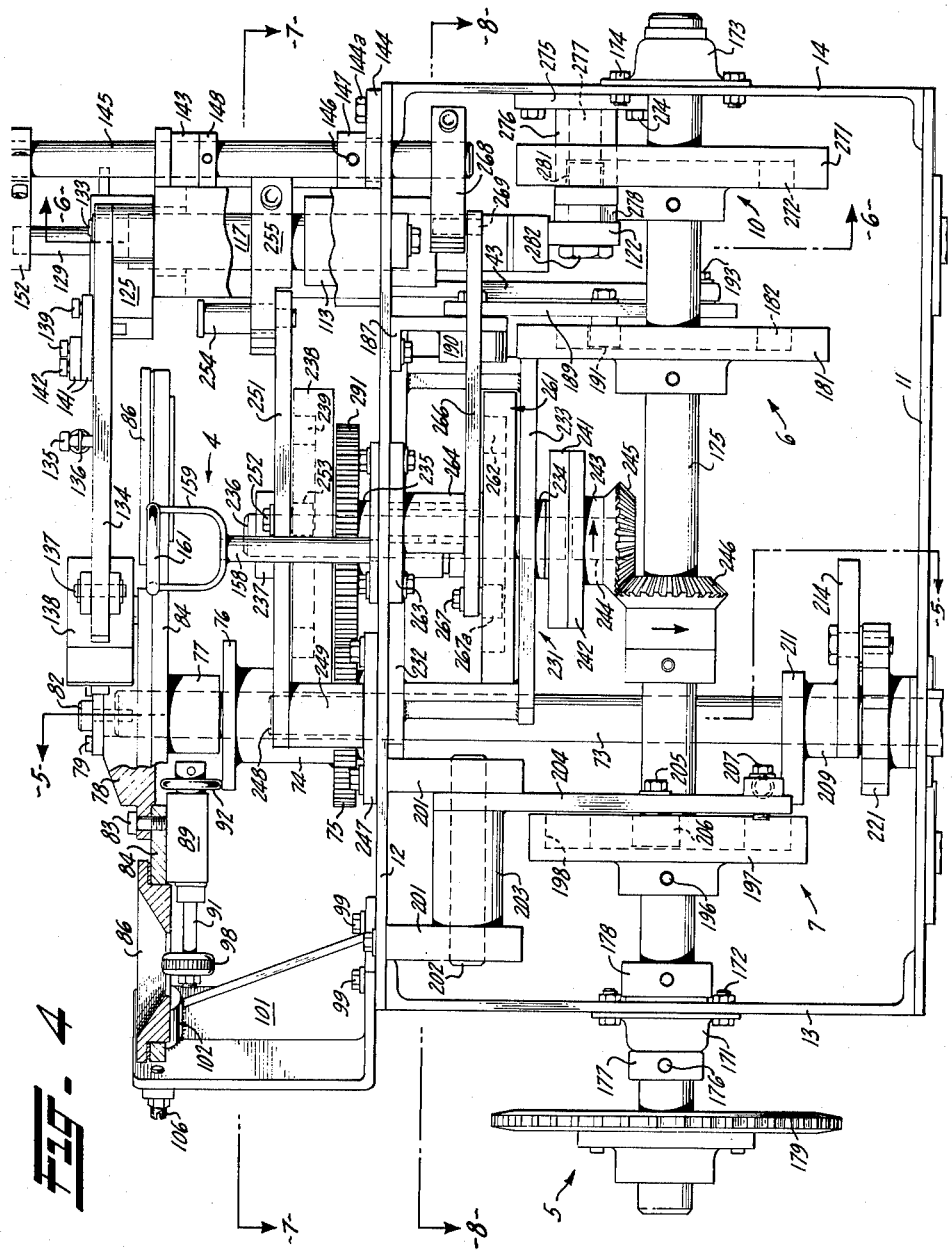

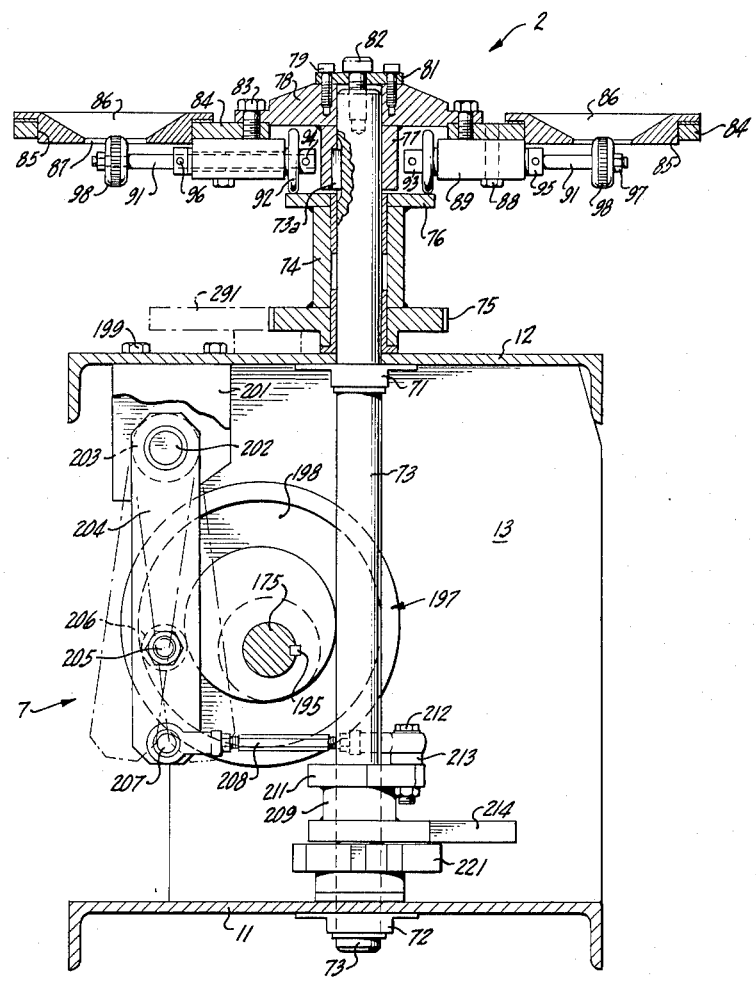

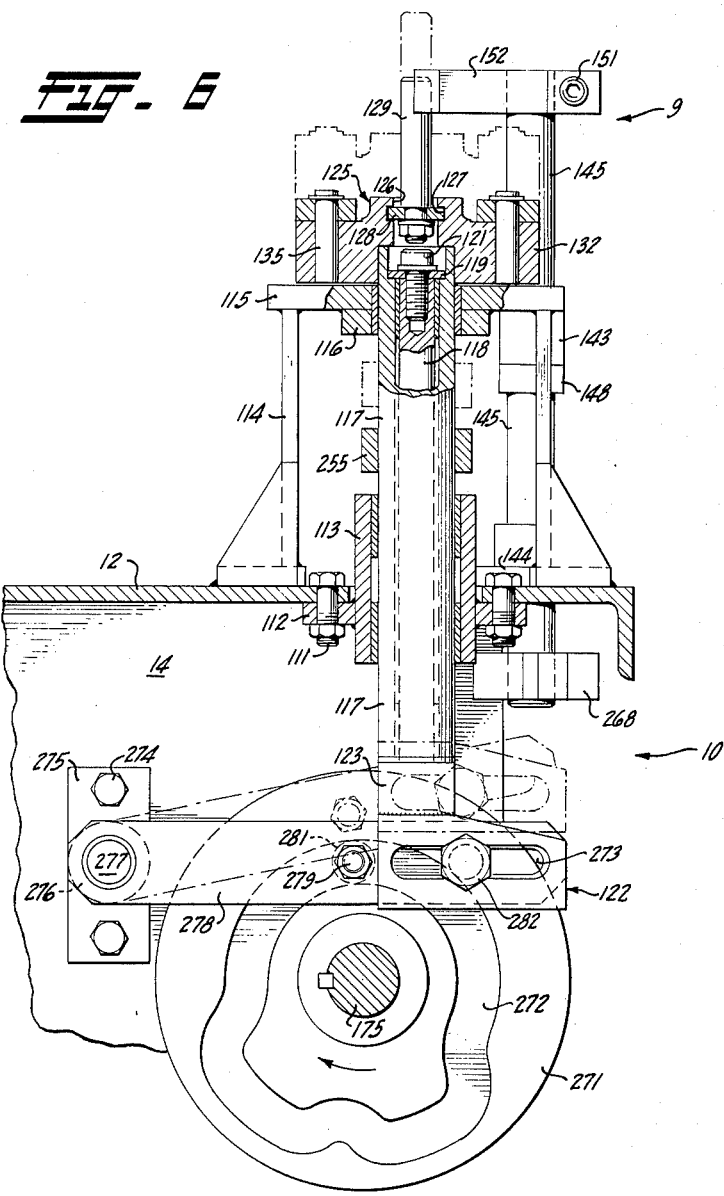

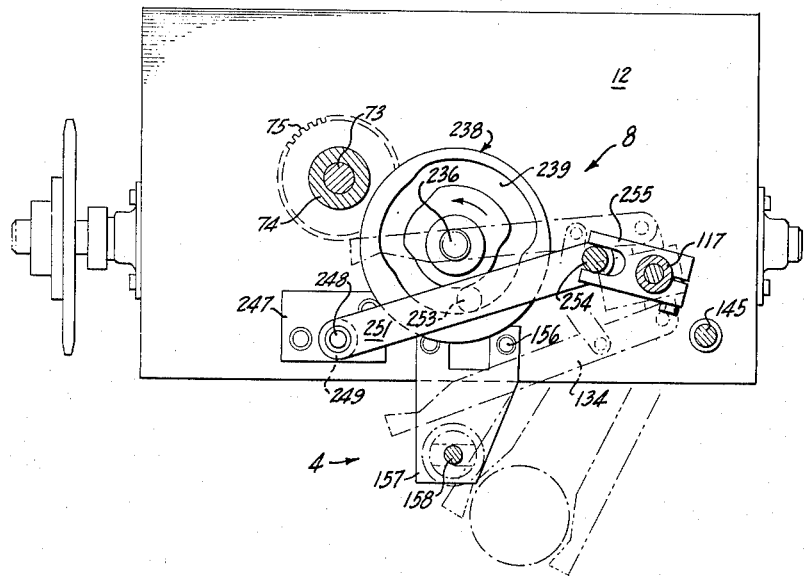
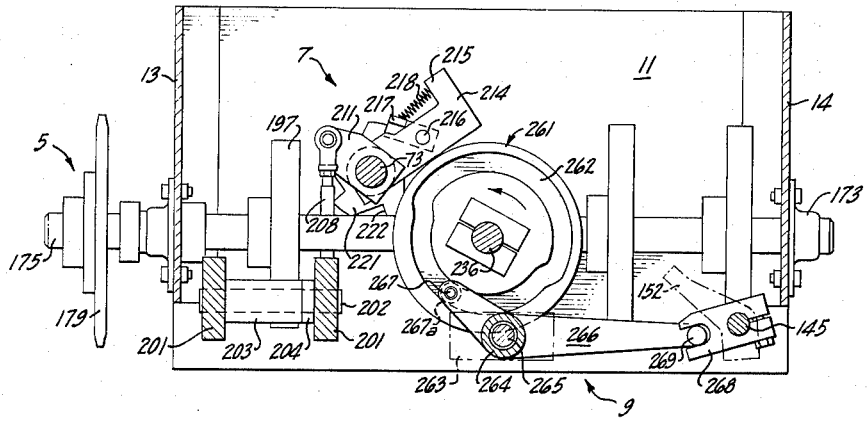

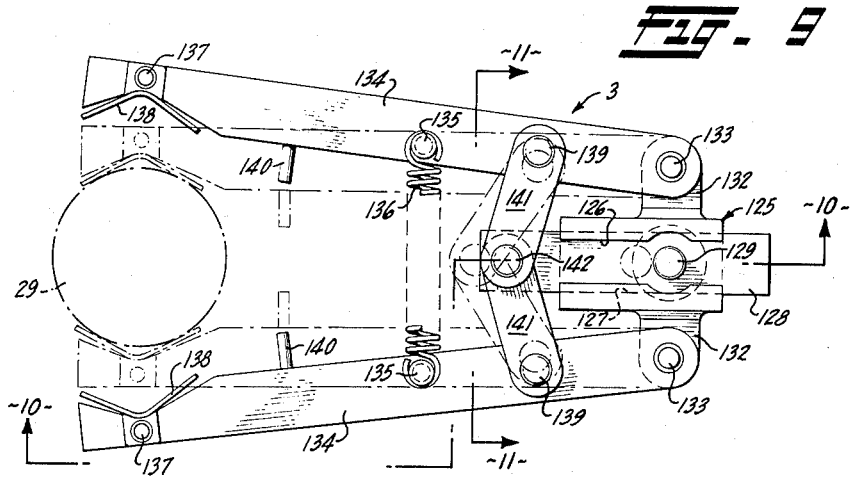
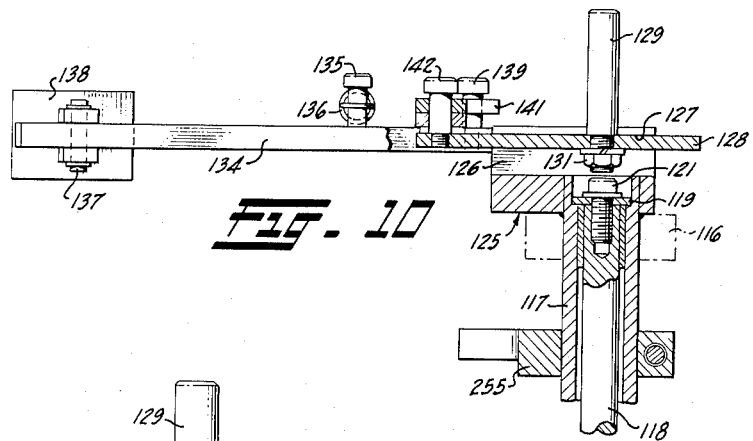
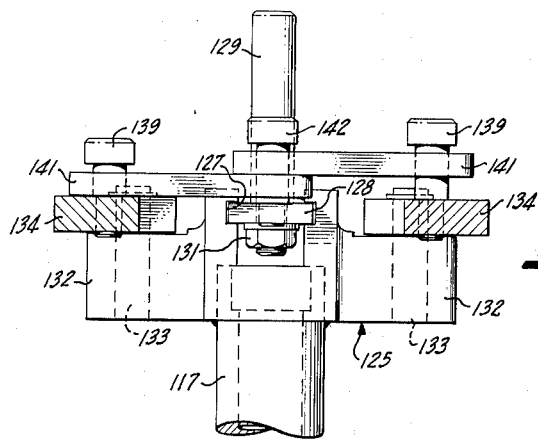

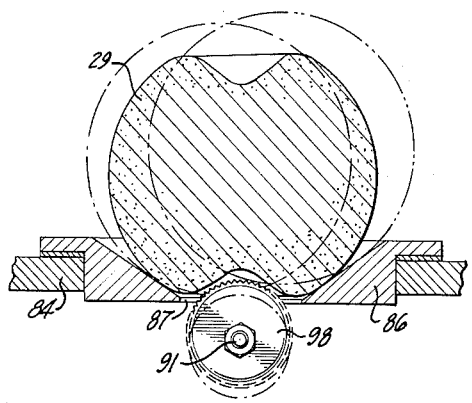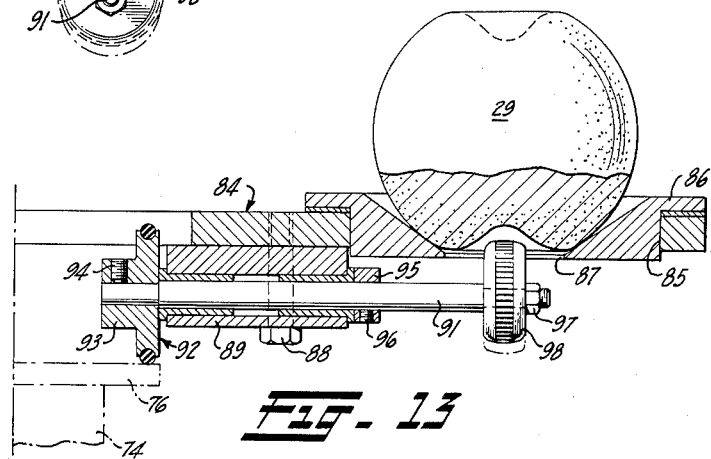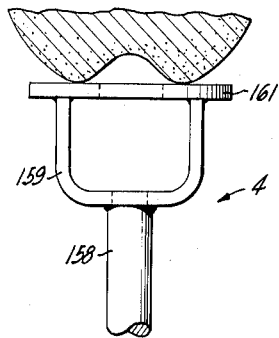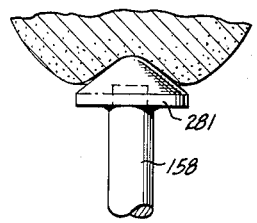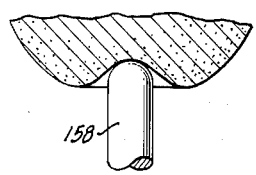

United States Patent Office 3,198,312
Patented Aug. 3, 1965

3,198,312
FRUIT ORIENTOR
Malcolm W. Loveland, Orinda, Calif., assignor to Atlas-Pacific Engineering Company, Emeryville, Calif., a corporation of California
Filed Nov. 5, 1962, Ser. No. 235,320
4 Claims. (Cl. 198—33)

This invention relates to and in general has for its object the provision of a machine for orienting apples and other fruit having stem-end depressions, relative to their core axes.

More specifically, one of the objects of this invention is the provision of a fruit orientor including: a fruit-receiving cup formed on its bottom with a central opening; a fruit-tumbling wheel mounted beneath the cup and partially protruding through said opening for frictional engagement with the surface of a fruit accommodated within the cup. As a result of this construction the rotation of the wheel results in tumbling the fruit until such time as one of its recesses is centered over the wheel. The dimensions of the wheel and the extent to which it protrudes above the floor of the cup is so chosen that when the fruit is centered within the cup the surfaces of its lower recess are out of frictional engagement with the wheel. Preferably, the wheel is eccentrically mounted and provided with a serrated periphery.

Another object of this invention is the incorporation of a plurality of orienting cups of the character above described, in an endless conveyor such as, for example, a turret table, the cups being spaced on a predetermined modulus and advanced stepwise at a predetermined rate to a fruit-feeding station located at a first dwell point of the cups, then to a fruit-discharging station located at a second and remote dwell point of the cups and finally back to the first-mentioned dwell point.

Still another object of this invention is the provision of a fruit orientor of the character above described including: an inclined trough for receiving a column of fruit; a cage or pocket formed at the lower end of the trough by a first normally closed upstream barrier and by a second normally open downstream barrier, and means for simultaneously retracting the upstream barrier to its open position and moving the downstream barrier to its closed position, and vice versa, all in synchronism with said predetermined rate. As a result of this construction the fruit contained in the trough is metered to the cups passing beneath it at the feeding dwell points thereof and in stepwise synchronism with the movement of the cups. Each time that the upstream barrier is retracted a fruit passes it and is restrained from further movement down the trough by the downstream barrier which now is closed. When the downstream barrier is retracted the first fruit is discharged and simultaneously the upstream barrier closes on the second fruit and restrains its further movement.

A further object of this invention is the provision in a fruit orientor of the character above described of a fruit leveling device including: a platform or rounded pin located intermediate the locus of movement of said jaws from their fruit-receiving station to their fruit-discharging station, and means for lowering said jaws to bottom the fruit on the platform or pin and then elevating the jaws. Here the fruit is lightly pressed on the platform or pin and the jaws may slide slightly downward over the fruit. By here using either a rounded pin or platform the operation results in centering the fruit on one of its end depressions or in locating one of its ends on a horizontal plane.

Still another object of this invention is the provision or an orientor of the character above set forth in which most of its moving components are synchronized by the use of cam tracks and wherein the use of electrical components is avoided.

The invention possesses other advantageous features, some of which, with the foregoing, will be set forth at length in the following description where those forms of the invention which have been selected for illustration in the drawings accompanying and forming a part of the present specification are outlined in full. In said drawings, several forms of the invention are shown, but it is to be understood that it is not limited to such forms, since the invention as set forth in the claims may be embodied in other forms.

Referring to the drawings:

FIG. 1 is a top plan of a fruit orientor embodying the the objects of my invention.

FIG. 2 is a right-hand side elevation of the fruit feeder subassembly.

FIG. 3 is a left-hand side elevation of the feeder subassembly.

FIG. 4 is a front elevation of the orientor with the feeder subassembly omitted.

FIG. 5 is a vertical section taken on the section line 5—5 of FIG. 4.

FIG. 6 is a vertical section taken on the section line 6—6 of FIG. 4.

FIG. 7 is a horizontal section taken on the section line 7—7 of FIG. 4.

FIG. 8 is a horizontal section taken on the section line 8—8 of FIG. 4.

FIG. 9 is an enlarged plan of the fruit-grasping and transferring subassembly.

FIG. 10 is a fragmentary vertical section taken on the section line 10—10 of FIG. 9.

FIG. 11 is a fragmentary vertical section taken on the section line 11—11 of FIG. 9.

FIG. 12 is an enlarged detail of the fruit-tumbling wheel subassembly of the orientor.

FIG. 13 is a view similar to that shown in FIG. 12 but taken at right angles thereto.

FIG. 14 is an enlarged detail of the fruit-leveling platform or ring.

FIG. 15 is a detail of an alternate form of fruit-leveling device.

FIG. 16 is a detail of an additional form of fruit-leveling device.

Generally, the orientor illustrated in these figures includes a fruit-metering subassembly, generally designated by the reference numeral 1, for taking fruits off an endless conveyor and feeding them one by one, in timed sequence, to a turret-type orientor subassembly generally designated by the reference numeral 2. After being oriented, the fruit is transferred by a jaw subassembly, generally designated by the reference numeral 3, from the orientor subassembly 2 to a leveling subassembly generally designated by the reference numeral 4 and then to the receiving cup of a fruit-peeling and coring machine. The entire orientor is driven by a main drive subassembly, generally designated by the reference numeral 5, including a main drive shaft. Driven from the main drive shaft is a feeder drive subassembly generally designated by the reference numeral 6, a turret-table drive subassembly generally designated by the reference numeral 7, a jaw translating drive subassembly generally designated by the reference numeral 8, a jaw closing and opening drive subassembly generally designated by the reference numeral 9, and a jaw elevating drive subassembly generally designated by the reference numeral 10.

More specifically, the orientor shown in these various figures is mounted on and in a housing and frame including a downwardly flanged bottom plate 11, a downwardly flanged top plate 12, a flanged side plate 13 and a flanged side plate 14. (FIGS. 4 and 5.)

*Fruit-metering subassembly 1*

Welded to the top and bottom plates 12 and 11 across the back of the machine is an upwardly and rearwardly disposed channel assembly 15 (FIGS. 2 and 3). Fastened to the web 16 of channel 15 by bolts 17 is a support bracket 18 formed at its upper free ends with flanges 19. Welded to and across the flanges 19 is an inclined, flat-bottomed, V-shaped trough 21 (FIG. 1) terminating at its upper end in outwardly extending side flanges 22. The flanges 22 are arranged to abut and to be detachably secured to the adjacent side 23 of a pan 24 housing a flat conveyor belt 25. Fixed to the side 23 by bolts 26 is a vertically and horizontally adjustable plate 27, and welded thereto is a rearwardly inclined hurdle and guide rod 28 paralleling the belt 25 with about ⅛" or ¼" clearance. The function of the rod 28 is to guide fruit 29 into the open upper end of the inclined main trough 21. When trough 21 is full of fruit, the fruit remaining on the belt and traveling with it can jump over the rod 28 and continue with the belt. As fast as fruit is discharged from chute 21, more fruit is diverted by rod 28 into chute 21 until full again.

Welded to the upper free end of channel assembly 15 is a plate 30, and detachably fixed thereto by bolts 31 is the flange 32 of the support 33 of the conveyor belt housing.

Journaled in aligned sleeve bearings 34 welded to the upper end of the inclined bracket 15 is a pin 35. Fixed to the pin 35 for rotation therewith are parallel first-class lever arms 36 provided at their downwardly bent free ends with a pair of slots 37. Adjustably secured to the ends of the lever arms 36 by bolts 38 passing through the slots 37 is a short trough extension 39 arranged to abut and form a continuation of the main trough 21. Secured to and depending from the upper end of the trough extension 39 is a trough gate 41 which, as shown in dot-dash line in FIG. 3, is arranged to close the main trough 21 when the trough extension 39 is in an elevated position. Fixed to the pin 35 and forming a first-class lever with the lever arm 36 on the right side of the machine as viewed in FIG. 2 is a downwardly inclined lever arm 42. Pivoted to the free end of the lever arm 42 is a longitudinally adjustable connecting rod 43 which, as will be presently explained, is connected to the feeder drive subassembly 6.

Fastened to the upper end of the bracket 15 (FIG. 3) is a forwardly inclined auxiliary bracket 45 extending above the main trough 21. Fixed to the upper end of the auxiliary bracket 45 is a sleeve bearing 46 and journaled therein is a pin 47. Adjustably clamped to the pin 47 by a machine bolt 48 is a lever 49. Pivoted to the left-hand side lever 36 is the lower end of a link 51 provided at its upper free end with an elongated lost-motion closed slot 52. Carried on the free end of the lever 49 is a pin 53 slidable within the confines of the slot 52. Fixed to the pin 47 for rotation therewith is an arm 54 provided at its free end with an elongated slot 55 and adjustably fixed therein is a pin 56 overlying the forward end of the main fruit trough 21. Anchored to the pin 53 is a biasing spring 57, the other end of said spring being fixed to a pin 58 carried by the link 51. The spring 57 therefore serves to bias the fruit barrier pin 56 downwardly to its closed position. As a result of this construction the pin 56 is disposed over the forward side of a fruit and thus prevents its further travel down the main trough or chute 21 when the gate 41 is in its lowermost or open position. When the gate 41 is elevated to its closed position the arm 54 raises the pin 56 to its upper position out of the path of the fruit behind it and thus lets that fruit drop to a position behind the closed gate 41. When the gate again drops to its open position, the fruit behind is allowed to drop beyond it and the pin 56 drops to a position in front of the next succeeding fruit, thus arresting its further movement until the device repeats its cycle of operation. The rate at which this cycle occurs, of course, depends upon the rate at which the connecting rod 43 is reciprocated.

*Turret-type orientor subassembly 2*

Journaled in vertically aligned bearings 71 and 72, respectively fixed to the housing top and bottom plates 12 and 11, is a drive shaft 73 (FIG. 5). Journaled on the shaft 73 above the top plate 12 is a sleeve 74. Welded to the bottom of the sleeve 74 is a spur gear 75, and welded to the top of the sleeve 74 is a circular friction drive plate 76. Extending over the top of the shaft 73 and keyed thereto by a key 73a is a collar 77, and welded to the top thereof is a hub 78 also mounted over the end of the shaft. Fixed to the hub by bolts 79 is a cap 81, and extending through the cap 81 and threaded into the shaft 73 is a machine screw 82 serving to firmly affix the hub 78 to the shaft. Fastened to the periphery of the hub 78 by bolts 83 is a peripherally scalloped turret table or plate 84. Formed in the plate 84 is a ring of circularly spaced holes 85, and receivable in each such hole is a shallow, dished, fruit-receiving cup 86 provided in its bottom with a central circular hole 87. As best shown in FIG. 1, five such cups are here used equally spaced on a modulus of 72°. Fastened to the under face of the ring 84 by bolts 88 are bearing blocks 89 in radial alignment with centers of the cups 86. Journaled in each of the bearing blocks 89 is a shaft 91. Mounted on the inner end of each shaft 91 is a rubber-tired roller 92 arranged to frictionally engage the friction plate 76 and provided with a hub 93. Extending through each hub is a set screw 94 serving to rigidly connect the roller to its shaft 91. Mounted on each shaft 91 adjacent its bearing block 89 is a collar 95, and extending through each collar is a set screw 96 serving to restrain the shaft 91 from axial movement. Eccentrically fastened to the threaded outer end of each of the shafts 91 by a nut 97 and on the center lines of the cup 86 is a heavily knurled or toothed fruit-tumbling wheel 98. Fastened to the top plate 12 by bolts 99 (FIG. 4) is a bracket 101 and welded thereto is a sleeve bearing 102 (FIGS. 1 and 4). Slidable in the sleeve is a round-headed pin 103 arranged to be received in one of five notches 104 formed in the periphery of the scalloped plate 84. Backing the pin 103 is a compression spring 105 seated in the end of an adjusting screw 106 carried by an offset finger 107.

Since the collar is keyed to the shaft 73 and free to move thereon, the pressure of the roller 92 on the friction plate 76 can be adjusted by the screw 82.

As will be presently described in fuller detail, the cups 86 are arranged to index with the shaft 73 and rotate therewith in increments of 72°, stopping beneath and in alignment with the mouth of the trough extension 39 so as to receive a fruit therefrom. After each cup has traveled in incremental steps through 288° it assumes a position in registration with the jaw subassembly 3.

*Jaw subassembly 3*

Extending through the top plate 12 and fastened thereto by bolts 111 (FIG. 6) is the flange 112 of a bearing sleeve 113. Welded to the top plate 12 over the flange 112 is an inverted U-shaped bracket 114 including a cross-plate 115. Welded to the bottom of the plate 115 in vertical registration with the bearing sleeve 113 is a bearing sleeve 116. Journaled in the bearing sleeves 113 and 116 for rotation and translation therein is a hollow shaft 117. Journaled within the hollow shaft 117 is a post 118. Seated on top of the post 118 within a counterbore formed in the upper end of the hollow shaft 117 is a washer 119. Extending through the washer 119 and threaded into the upper end of the post 118 is a screw 121. This structure merely holds the post 118 in place within the hollow shaft 117 but permits the hollow shaft to rotate about the post. Rigidly fixed to the lower end of the post 118 is a fitting 122 provided with an integral collar 123 abutting the lower end of the hollow shaft 117. As a result of this construction the hollow shaft 117 and the post 118 can be translated vertically as an integral unit and the hollow shaft 117 can be rotated around the nonrotatable post 118.

Seated on the upper counterbored end of the hollow shaft 117 and welded thereto is a jaw-supporting block 125, and formed in the upper end thereof is an elongated slot 126 (FIGS. 9, 10 and 11). Milled in the sides of the slot 126 are opposed, undercut grooves or ways 127, and slidably disposed therein is a rectangular slide 128. Extending through the slide 128 is the threaded lower end of an upstanding pin 129, and threaded on the lower end thereof is a nut 131 for firmly securing the pin to the slide.

Pivoted to opposed, laterally extending ears 132, formed integral with the supporting block 125 by pins 133, are opposed jaw arms 134. Anchored on pins 135 fixed to the arms 134 intermediate their ends is a tension spring 136 serving to bias the two jaw arms together. Pivoted to each end of the jaw arms 134 by pins 137 are opposed V-shaped fruit-grasping paddles 138 positioned, as shown in FIG. 1, to substantially overlie the terminal station of one of the fruit-receiving cups 86. Pivoted to each of the jaw arms 134 by pins 139 is a spreader link 141, the inner ends of the links 141 being pivoted to a common pin 142 carried by the inner end of the slide 128. As a result of this construction the movement of the slide 128 to the right as viewed in FIG. 1 serves to retract the jaws 138 against the biasing action of the tension spring 136. Secured to the inner sides of the jaw arms 134 are opposed and aligned, inwardly extending limit pins 140 serving to limit the collapsing movement of the jaws 138 (FIG. 9).

Formed integral with the bracket plate 115 is a depending bearing 143, and aligned therewith is a bearing 144 fixed to the top plate 12 (FIG. 4) by bolts 144a. Journaled in the bearings 143 and 144 is a shaft 145. Secured to the shaft 145 above the bearing 144 by a set screw 146 is a thrust collar 147. Mounted on the shaft 145 beneath the bearing 143 is a thrust collar 148. As a result of this construction the shaft 145 is free to rotate, but restrained from axial movement.

Clamped to the upper end of the shaft 145 by a screw 151 and in horizontal alignment with the upstanding pin 129 is a finger 152 (FIGS. 1, 4 and 6). As best indicated in FIG. 1, the free end of the finger 152 contacts the left side of the pin 129 and consequently a clockwise rotation of the finger results in forcing the pin 129 to the right, thereby to open the jaws 138.

Mounted on the rear end of the bracket plate 115 by screws 153 is an arcuate guard ring 154 paralleling the forward periphery of the fruit-receiving cup 86 indexed with the trough extension 39. This structure restrains a fruit falling into the cup from overriding the cup.

*Fruit-leveling subassembly 4*

Mounted on the top plate 12 by screws 156 (FIGS. 4 and 7) is a bracket 157, and fixed thereto is an upwardly extending post 158 terminating at its upper end in a yoke 159. Mounted on the yoke 159 is a fruit-leveling ring 161 located on a level with the fruit cups 86 and in the locus of the fruit jaws 138.

Although not an element of the orientor herein described, as indicated in FIG. 1 the orientor is so positioned relative to a fruit corer and peeler that the fruit-receiving cup 162 of the latter machine also lies in the path of the jaws 138 in a position to receive an oriented fruit released by the jaws.

In summary, the jaw subassembly 3 functions as follows: As one of the cups, during its counterclockwise rotation (FIG. 1), approaches its terminal station, the jaws 138, which are in the path of an oriented fruit supported by this cup, are in their fully open position. By the time that the fruit has reached this point, it has been sufficiently tumbled by the eccentric tumbling wheel 98 to bring the stem- or calyx-end depression of the fruit into registration with the tumbling wheel. When the cup 86 stops at its terminal station the jaws are made to close on it. The jaws with the fruit are then elevated so as to clear the fruit cup and are then rotated to a position over the leveling ring 161. The jaws hesitate briefly at this station and are there lowered a sufficient distance to bottom the fruit on the ring. Here the jaws move downwardly over the fruit to a slight extent. Following this the jaws are elevated and continue to their discharge station over the cup 162 and are there lowered and made to open to release the oriented and leveled fruit within the cup 162. Finally, the jaws are returned to the terminal station of the cups 86, ready to receive the next succeeding fruit.

*Main drive subassembly 5*

As best shown in FIG. 4, the main drive subassembly includes a bearing 171 fixed to the side plate 13 by bolts 172 and a bearing 173 fixed to the plate 14 by bolts 174 and axially aligned with the bearing 171. Journaled in the bearings 171 and 173 is a main drive shaft 175. Fixed to the shaft 175 by a set screw 176 and adjacent its left end as viewed in FIG. 4 is a thrust collar 177. Similarly attached to the shaft 175 on the right side of the plate 13 is a thrust collar 178. Fixed to the left end of the shaft 175 is a sprocket wheel 179 arranged to be connected by a sprocket chain (not shown) to a source of power.

*Fruit-metering drive subassembly 6*

Keyed to the shaft 175 (FIGS. 2 and 4) is a disc 181 provided on one face thereof with a cam track generally designated by the reference numeral 182. The cam track 182 includes a circular cam track dwell section 183, an opposed arcuate cam track dwell section 184 formed slightly farther from the axis of the shaft 175 than the cam track section 183, and two opposed and intermediate "S" sections 185 and 186. Fixed to the top plate 12 is a depending bracket 187 and carried thereon is a bearing sleeve 190. Journaled in the sleeve 190 is a pin 188, and swiveled thereon is an arm 189. Journaled on the arm 189 is a cam track follower roller 191 accommodated within the cam track 182. Formed on the free end of the arm 189 is an elongated, closed slot 192, and adjustably fixed therein is a pin 193 rotatably fixed to the lower end of the connecting rod 43 for actuating the chute extension 39, the gate 41, and the barrier pin 56.

As a result of this construction the connecting rod 43 is translated axially and thus controls the operation of the gate 41 and the fruit barrier pin 56, as previously described.

*Turret-table subassembly drive 7*

Keyed to the shaft 175 by a key 195 and a set screw 196 (FIGS. 4 and 5) is a cam track disc 197, and formed eccentrically on one face thereof is a circular cam track 198. Fastened to the top plate 12 by machine screws 199 and depending therefrom are a pair of opposed brackets 201. Supported by the brackets 201 is a shaft 202, and journaled thereon is a sleeve 203. Formed integral with the sleeve 203 and depending therefrom is an arm 204. Fixed to the arm 204 intermediate its ends is a pin 205, and journaled thereon is a cam follower roller 206 accommodated in the cam track 198. As a result of this construction the rotation of the shaft 175 causes the free end of the arm 204 to oscillate about the axis of the pin 202.

Carried on the free end of the arm 204 is a pin 207, and journaled thereon by a ball joint is one end of a horizontally extending connecting rod 208. Journaled on the shaft 73 below the level of the rod 208 is a sleeve 209 (FIG. 5) formed integral with a finger 211. Mounted on the finger 211 is a pin 212, and journaled thereon above a spacing washer 213 by another ball joint is the right-hand end of the rod 208. This construction permits the rod 208 to pivot and angularly flex about axis perpendicular to the pins 207 and 212. Attached to the lower face of the sleeve 209 for rotation therewith is a pawl supporting plate 214 (FIG. 8) including an offset 215. Mounted in the plate 214 intermediate its ends is a pin 216, and journaled thereon is a dog or pawl 217. Anchored to and between the free end of the pawl 217 and the offset 215 is a compression spring 218. As a result of this construction the plate 214 and its pawl 217 oscillate on the shaft 73 under the influence of the reciprocating movement of the connecting rod 208.

Fixed to the shaft 73 immediately below the plate 214 is a five-toothed ratchet wheel 221, each tooth having a flat radial shoulder 222 engageable by the free end of the pawl 217. As viewed in FIG. 8, the pawl 217, upon the counterclockwise stroke of its oscillatory movement, engages one of the flat shoulders 222 of the ratchet wheel 221 and advances it through an angle of 72°. Upon the return stroke of the plate 214, the pawl 217 merely slides over the back of the tooth into engagement with the shoulder 222 of the next succeeding tooth. In this manner, then, the plate or turret table 84 is advanced in increments of 72° and is locked in such position under the influence of the spring-biased indexing pin 103 (FIG. 1).

Jaw-translating subassembly drive 8

Fixed to the underside of the top plate 12 is a box-shaped bracket generally designated by the reference numeral 231 and including a top plate 232 and a bottom plate 233. Carried by the bottom plate 233 is a bearing 234, and fastened to the top plate 232 is a bearing 235 aligned with the bearing 234. Journaled in these two bearings is a shaft 236 (FIGS. 4 and 7). Fixed to the upper end of the shaft 236 by a hub 237 is a cam track disc 238 provided on its upper face with a closed cam track 239. Fixed to the lower end of the shaft 236 is a coupling member 241 mating with a complementary coupling member 242 fixed by a hub 243 to a stub shaft 244. This construction permits exact timing adjustment between the shafts 175 and 236. Fastened to the stub shaft 244 is a beveled gear 245 in mesh with a beveled gear 246 fixed to the main drive shaft 175. As a result of this construction, rotation of the main shaft 175 effects the rotation of the cam disc 238.

Bolted to the top plate 12 is a plate 247, and fixed thereto is an upstanding pin 248. Here it should be noted that, as viewed in FIG. 4, the pin 248 is in direct alignment with the turret table shaft and the collar 74, but lies forwardly thereof. However, the precise position of the pin 248 is entirely dependent on the action of the cam 238. Swiveled to the pin 248 is a collar 249, and formed integral with its upper end is an arm 251. Carried by the arm 251 intermediate its ends is a pin 252, and journalled thereon within the confines of the cam track 239 is a cam follower roller 253. Carried on the free end of the arm 251 is an upstanding pin 254. Clamped to the rotatable and axially translatable hollow shaft 117 is a yoke 255 arranged to engage the upstanding pin 254. As best indicated in Fig. 7, the rotation of the cam track 239 results in the oscillation of the arm 251 about the pin 248 and this, in turn, results in the oscillation of the yoke 255 and the clockwise and counterclockwise rotation of the hollow shaft 117 and the jaw subassembly block 125. Here it should be noted that the yoke 255 is free to move vertically relative to the pin 254, this construction being essential to permit the jaw subassembly to be raised and lowered as previously described.

Jaw-closing and opening subassembly 9

Keyed to the shaft 236 (FIGS. 4 and 8) is a cam track disc 261 provided on its upper face with a closed cam track 262. Bolted to the lower face of the top plate 12 is a plate 263, and formed integral therewith is a depending sleeve bearing 264. Receivable in the bearing 264 is a pin 265 fixed at its lower end to a cam follower arm 266. Carried on the left end of the arm 266, as viewed in FIG. 4, is a pin 267, and journaled on the lower end thereof is a cam follower roller 267a receivable in the cam track 262. As a result of this construction the rotation of the cam track 262 causes the arm 266 to oscillate. Fixed to the lower end of the shaft 145 is a yoke 268 arranged to straddle an upstanding pin 269 carried on the free end of the cam track follower arm 266. As a result of this construction the oscillation of the arm 266 effects the oscillation of the shaft 145 and the finger 152 mounted on its upper end and which serves to actuate the pin 129 and the toggle connection associated therewith.

Jaw-elevating drive subassembly 10

Keyed to the right-hand end of the main drive shaft 175 as viewed in FIG. 4 is a cam track disc 271 provided on its inner face with a cam track 272. Formed in the fitting 122 carried on the lower end of the post 118 (FIG. 6) is a closed, elongated, horizontal slot 273.

Fixed to the side plate 14 (FIG. 4) by bolts 274 is a foot 275, and formed integral therewith is a horizontally extending bearing sleeve 276. Journaled in the sleeve 276 is a pin 277. Fixed to the end of the pin 277 for rotation therewith is a cam track follower arm 278. Carried by the arm 278 intermediate its ends is a pin 279, and journaled thereon is a cam follower roller 281 receivable in cam track 272. Extending through the elongated slot 273 and slidable therein is a headed pin 282 secured at its opposite end to the arm 278. As a result of this construction the rotation of the cam track disc 271 causes the arm 278 to oscillate about the axis of the pin 277, and this in turn results in the reciprocation of the hollow shaft 117 (and the post 118) on which the jaw-supporting block 125 is mounted.

Fruit-tumbling drive subassembly

Keyed to the shaft 236 (FIG. 4) is a gear 291 in mesh with the gear 75 carried on the collar 74 and serving to continuously drive the friction plate 76 at a relatively high rate. This then results in the rotation of the eccentric, knurled or toothed tumbling wheels 98 throughout the entire cycle of operation of the machine. When a fruit such as an apple is oriented in its cup 86 with either its stem end or flower end recess or dimple facing downwardly, the periphery of the tumbling wheel lies within the confines of one of the recesses without touching the apple. Otherwise the tumbling wheel engages the apple and serves to tumble the apple until it is properly oriented. This normally occurs prior to the time that the apple reaches its terminal or transfer station. Although not generally appreciated, the recesses at the two ends of an apple core are of substantially the same size and configuration as indicated in FIG. 12. The diameter and eccentricity of the tumbling wheels 98 and the inclination of the walls of the cups are such that when an apple is properly oriented, as shown in FIG. 12, the wheel is no longer in contact with the apple. Also, in most cases the indented faces of an apple are normal to its axis, as indicated in FIG. 14. If, then, the jaws of the machine bottom an apple on the leveling ring, the axis of the apple will then lie in a vertical position.

As an alternative to the yoke 159 and ring 161, a centering cone 281 can be mounted on the post 158 as indicated in FIG. 15 or, as still another alternative, the upper end of the post 158 may simply be rounded as indicated in FIG. 16. Both alternatives serve to center the apple and to vertically align its core axis.

I claim:

1. A fruit orientor comprising: an endless conveyor provided with fruit-receiving cups spaced on a predetermined modulus and each provided on its bottom with a central hole; a fruit-tumbling wheel eccentrically mounted adjacent the bottom of each cup centrally thereof and for movement therewith and protruding into its associated hole; means for continuously rotating said wheels; and means for moving said endless conveyor in increments equal to said modulus and for causing said conveyor to dwell at the terminus of each increment of movement.

2. A fruit orientor comprising: an endless conveyor provided with fruit-receiving cups spaced on a predetermined modulus and each provided on its bottom with a central hole; a fruit-tumbling wheel eccentrically mounted adjacent the bottom of each cup centrally thereof and for movement therewith and protruding into its associated hole; means for continuously rotating said wheels; means for moving said endless conveyor in increments equal to said modulus and for causing said conveyor to dwell at the terminus of each increment of movement; means for metering fruit to said cups at a feeding station indexed with one of said termini; and means located at a subsequent terminus in the locus of said cups for removing fruit therefrom.

3. Apparatus for orienting fruit having stem-end depressions which comprises: an endless conveyor provided with fruit-receiving cups spaced on a predetermined modulus and each provided on its bottom with a central hole, a fruit-tumbling wheel eccentrically mounted adjacent said bottom of each of said cups centrally thereof for movement therewith, each of said wheels protruding into its associated hole for a distance less than the depth of said depression and having a diameter such that when so protruded said wheel may be accommodated in said depression, means for continuously rotating said wheels, and means for moving said endless conveyor in increments equal to said modulus and for causing said conveyor to dwell at the terminus of each increment of movement.

4. A fruit orientor comprising: an endless conveyor provided with fruit-receiving cups spaced on a predetermined modulus and each provided on its bottom with a central hole; a fruit-tumbling wheel eccentrically mounted adjacent the bottom of each cup centrally thereof and for movement therewith and protruding into its associated hole; means for continuously rotating said wheels; means for moving said endless conveyor in increments equal to said modulus and for causing said conveyor to dwell at the terminus of each increment of movement; means for metering fruit to said cups at a feeding station indexed with one of said termini including a trough having its longitudinal axis inclined toward said cups, a trough extension having a dimension in the direction of said longitudinal axis slightly in excess of the diameter of said fruit, means for mounting said trough extension in a first position abutting said trough to form a continuation thereof, a trough gate suspended from the upper end of said trough extension, means for reciprocally lifting said trough extension from said first position to a second position wherein said trough gate prevents passage of said fruit from said trough, and means for co-ordinating said lifting with said conveyor; a pair of jaws mounted adjacent said subsequent terminus for rotation from a first position facing an oncoming cup to a second position facing away from said cup; means for closing said jaws when over said cup; means for rotating said jaws from said first position to said second position; an upstanding pin located in the locus of said second position; an upstanding pin located in the locus of said jaws intermediate said first and second positions; means for causing said jaws to dwell, lower and rise over said pin during the rotation of said jaws from said first position to said second position; means for lowering and opening said jaws at said second position; and means for returning said jaws to said first position.

References Cited by the Examiner

UNITED STATES PATENTS

| | | | |
|---|---|---|---|
| 1,336,304 | 4/20 | Leumann. | |
| 1,964,152 | 6/34 | Hansen | 198—20 |
| 2,583,708 | 1/52 | Rose | 198—135 |
| 2,713,409 | 7/55 | Bartlett | 198—20 |
| 2,788,818 | 4/57 | Skog | 198—33 |
| 2,889,911 | 6/59 | Keesling | 198—26 |
| 2,929,488 | 3/60 | McClelland | 198—26 |
| 2,933,174 | 4/60 | Hait | 198—33 |
| 2,969,867 | 1/61 | McClelland | 198—33 |
| 3,064,794 | 11/62 | Anderson | 198—33 |

SAMUEL F. COLEMAN, *Primary Examiner.*

EDWARD A. SROKA, *Examiner.*